(12) United States Patent
Cohen et al.

(10) Patent No.: US 6,938,250 B2
(45) Date of Patent: Aug. 30, 2005

(54) IMAGE-BASED SOFTWARE INSTALLATION

(75) Inventors: Jason Cohen, Seatac, WA (US); Ryan Burkhardt, Redmond, WA (US); Wesley G. Miller, Snohomish, WA (US); Tom Yaryan, Seattle, WA (US); Bruce L. Green, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 498 days.

(21) Appl. No.: 10/167,889

(22) Filed: Jun. 12, 2002

(65) Prior Publication Data

US 2003/0233646 A1 Dec. 18, 2003

(51) Int. Cl.[7] .............................................. G06F 9/445
(52) U.S. Cl. ........................ 717/178; 717/173; 717/175
(58) Field of Search ................................ 717/168–178

(56) References Cited

U.S. PATENT DOCUMENTS

| | | |
|---|---|---|
| 5,142,680 A | 8/1992 | Ottman et al. |
| 5,539,730 A | 7/1996 | Dent |
| 5,555,416 A | 9/1996 | Owens et al. |
| 5,684,996 A | 11/1997 | Westerholm et al. |
| 5,794,052 A | 8/1998 | Harding |
| 6,016,400 A | 1/2000 | Day et al. |
| 6,080,207 A | 6/2000 | Kroening et al. |
| 6,199,203 B1 | 3/2001 | Saboff |
| 6,247,128 B1 | 6/2001 | Fisher et al. |
| 6,262,726 B1 | 7/2001 | Stedman et al. |
| 6,360,365 B1 | 3/2002 | Curtis |
| 6,374,401 B1 | 4/2002 | Curtis |
| 6,385,766 B1 | 5/2002 | Doran, Jr. et al. |
| 6,453,413 B1 | 9/2002 | Chen et al. |
| 6,512,526 B1 | 1/2003 | McGlothlin et al. |
| 6,598,223 B1 | 7/2003 | Vrhel, Jr. et al. |
| 6,681,323 B1 | 1/2004 | Fontanesi et al. |
| 6,711,624 B1 | 3/2004 | Narurkar et al. |
| 2001/0042112 A1 | 11/2001 | Slivka et al. |
| 2002/0013939 A1 | 1/2002 | Daynes et al. |
| 2002/0016956 A1 | 2/2002 | Fawcett |
| 2002/0174329 A1 | 11/2002 | Bowler et al. |
| 2002/0194398 A1 | 12/2002 | Bentley et al. |
| 2004/0070678 A1 | 4/2004 | Toyama et al. |
| 2004/0218902 A1 | 11/2004 | Yanagita |

OTHER PUBLICATIONS

Zhang et al., "A Modeling Perspective of Image–Based Installation", Dell White Paper, pp. 1–13, Mar. 2002.*

White Paper, "Microsoft Windows 2000 Server—Remote Operating System Installation", Microsoft Corporation, pp. i–iv, 1–41, 1999.*

Yang, "Creating the Standard Desktop Environment in a Non–Standard World," Proceedings of the 29th Annual Conference on University and College Computing Services, 2001, pp. 215–218, vol. 29, ACM Press, New York, U.S.A.

Howland, "Managing Computer Science Laboratories Using Open Software," Proceedings of the Seventh Annual Consortium for Computing in Small Colleges Central Plains Conference on the Journal of Computing in Small Colleges, 2001, pp. 117–126, The Consortium for Computing in Small Colleges, U.S.A.

Hutchinson et al., "Logical vs. Physical File System Backup," Proceedings of the Third Symposium on Operating Systems Design and Implementation, 1999, pp. 239–249, USENIX Association, California, U.S.A.

(Continued)

Primary Examiner—Ted T. Vo
(74) Attorney, Agent, or Firm—Senniger Powers

(57) ABSTRACT

A system and method for copying a run-time image independent of computer context from a source computer-readable medium to one or more target computer-readable media of a target computer. Software of the invention integrates the copied software product with the target computer. The software applies an operating system and/or associated application programs to the target computer as a run-time image.

25 Claims, 5 Drawing Sheets

OTHER PUBLICATIONS

Dubose, "Manage All the Computer Labs on Computer? What Did I Do To Deserve This?" Proceedings of the 28th Annual Conference on User Services: Building the Future, 2000, pp. 74–78, ACM Press, New York, U.S.A.

Kunz et al., "The ISU Micronet Scout," Proceedings of the 25th SIGUCCS Conference on User Services: Are You Ready?, 1997, pp. 185–195, ACM Press New York, U.S.A.

* cited by examiner

IMAGE-BASED SOFTWARE INSTALLATION

TECHNICAL FIELD

The present invention relates to the field of software installation. In particular, this invention relates to a system and method for image-based software installation.

BACKGROUND OF THE INVENTION

Operating systems are at the heart of all computer systems or computerized devices. An operating system provides an environment in which software applications and hardware are designed to operate. To that end, the operating system manages and schedules the resources of the computer or device it resides in, and provides various function modules and interfaces that can be used by the application programs to accomplish their tasks.

In some prior art systems, installation of application programs and operating systems is accomplished by discovering information about the hardware on the system, copying and decompressing source files, installing those files through such methods as library registration, and then configuring those installed files based on user input. This installation process is typically time consuming and many of the actions, particularly in the installing files phase, are the same regardless of the system that the application or operating system is installed on. With these prior art systems, discovering system information, copying and decompressing files, installing and registering files, and configuring user desires requires a significant length of time. Such systems lack a method for performing common installation actions once for a plurality of computers.

For these reasons, a system for image-based installation is desired to address one or more of these and other disadvantages.

SUMMARY OF THE INVENTION

The invention provides software for image-based installation. In particular, the invention includes software to transfer a run-time image independent of computer context from a source computer-readable medium to one or more target computer-readable media of a target computer via one or more transfer computer-readable media. The software applies an operating system and/or associated application programs as a run-time image.

The whole-image software installation technique of the invention provides for installing an entire image of a software product or other software program rather than a collection of individual files that comprise the software product. If the software product is an operating system, the software of the invention boots a minimal operating system from a computer-readable medium, configures local hardware, configures minimal settings, applies an image of the software, and boots into the applied software image for subsequent customization of preferences by the user, registration, and the like. Traditional, common installation tasks are performed during the creation of the software product prior to applying and therefore do not need to be performed again on the target computer. As a result, the applied software image product of the invention does not perform a traditional installation on the target computer saving time and reducing exposure to errors. Setup tasks specific to the target computer are then performed as integration tasks on the target computer after the imaging process. The software of the invention is independent of the format, partitioning, or geometry of the computer-readable media of the target computer.

The software of the invention transfers an image that is hardware independent and installs to any computer-readable medium. In addition, during integration, other components can be added or installed to the image. Such components may reside as uninstalled objects within the image or may be accessible via a network share or otherwise available from any valid uniform resource locator. The software also provides consistency of installation of software products in that most failure points have been encountered while creating the software product prior to applying the image.

In accordance with one aspect of the invention, a method transfers a run-time image independent of computer context from a source computer-readable medium to one or more target computer-readable media of a target computer by one or more transfer computer-readable media. In particular, the method includes copying the run-time image to the transfer media along with an executable install routine. The executable install routine, when executed by the target computer, applies the run-time image to the target media and integrates the run-time image with the target computer.

In accordance with another aspect of the invention, a method transfers a run-time image independent of computer context from a source computer-readable medium to one or more target computer-readable media of a target computer. In particular, the method includes applying the run-time image to the target media, and copying an executable install routine to the target media. The executable install routine, when executed by the target computer, integrates the run-time image with the target computer.

In accordance with yet another aspect of the invention, a computer-readable media includes computer-executable components. The computer-executable components apply a run-time image independent of computer context to one or more target computer-readable media of a target computer. The components include a run-time image for use by the target computer. The components also include an executable install routine which, when executed by the target computer, applies the run-time image to the target media and integrates the applied run-time image with the target computer.

In accordance with yet another aspect of the invention, a computer-readable medium stores a data structure representing a list of one or more integration tasks. A target computer, including one or more target computer-readable media, executes the integration tasks to integrate a run-time image independent of computer context with the target computer. The data structure includes one or more data fields that store computer-executable instructions. The computer-executable instructions apply the run-time image to the target media. The computer-executable instructions also determine one or more parameters specific to the target computer. Further, the computer-executable instructions integrate the determined parameters and the run-time image.

In accordance with yet another aspect of the invention, a computer-readable media includes computer-executable components. The computer-executable components apply a run-time image independent of computer context to one or more target computer-readable media of a target computer. The computer-executable components include an imaging tool that applies the run-time image to the target media. The computer-executable components also include an integration module that integrates the applied run-time image with the target computer.

Alternatively, the invention may comprise various other methods and apparatuses. Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
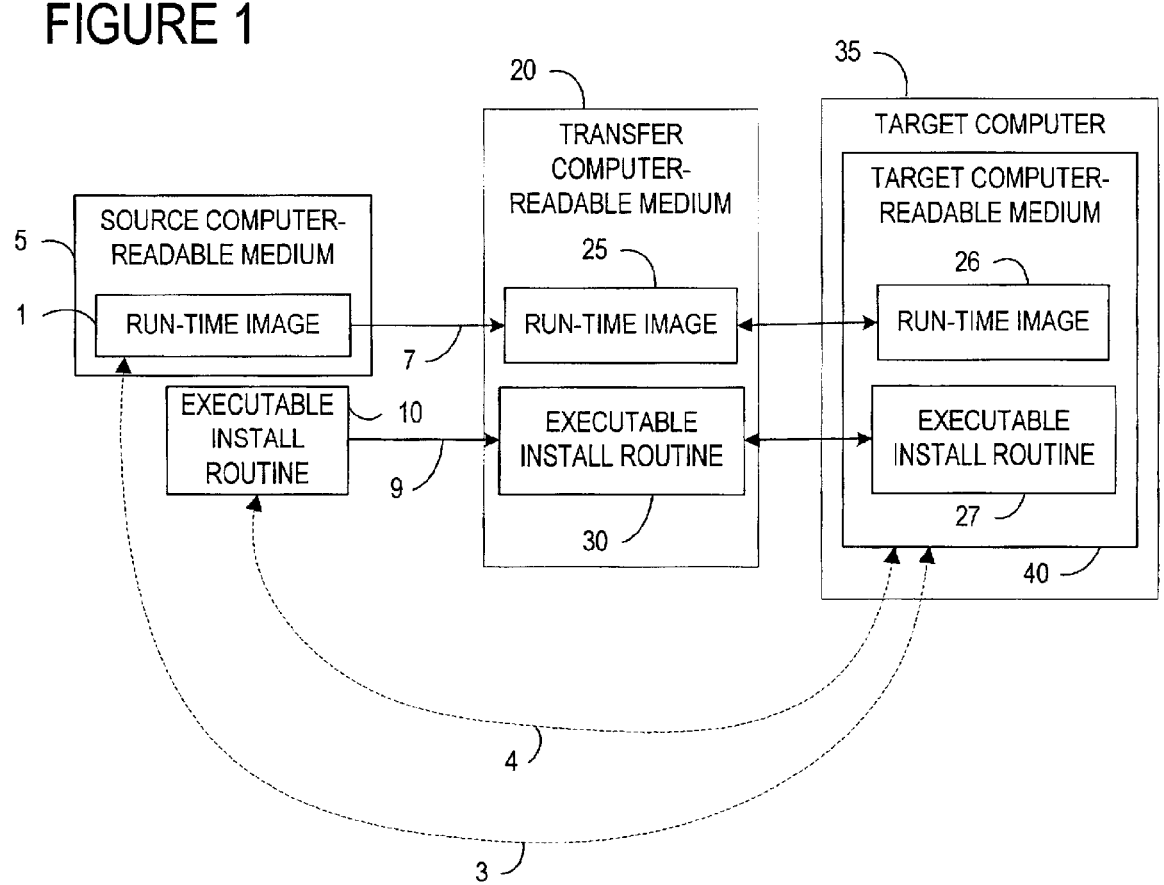
FIG. 1 is an exemplary block diagram illustrating the transfer of a run-time image from a source computer-readable medium to a target computer-readable medium.

Many modern operating systems and applications are not shipped to end-users in a ready-to-run state. Instead, additional processing is required to complete the integration onto the end-user's ("target") computer, a process typically known as "setup" or "install." Simple software, for example, might simply set one or more system settings (e.g., registry keys). Other software may define device drivers or services. This integration process occurs while the target computer system is executing an operating system. In contrast, the process described herein according to the invention provides a means (among other things) for transferring a pre-processed software product or other software program as a "run-time image" that is a ready-to-run operating system or application program that generally does not require, or requires very little, additional "setup" or "install" processing on the target computer (see FIG. 1). The pre-processed software product prior to installation on the target computer is independent of computer context including, but not limited to, hardware configurations, software settings, and user configuration data. That is, the pre-processed software product is operable with different hardware or software configurations of target computers. In addition, the run-time image that is independent of computer context may be prepared for a new user or have other configuration data reset (e.g., timers). It will be appreciated by those skilled in the art, however, that the generic architecture of the invention is equally applicable to transferring run-time images of other types of software programs. The functionality of software is defined by a series of files that are to be copied into the run-time image and a set of system settings and values that have to be edited or added to the target computer.

The software functionality of the invention improves the traditional install process while using an image of the software product instead of individual files stored on a computer-readable medium (CRM). For example, in some systems, installing software includes copying a plurality of files to the target computer, then registering the installed files. Registration adds system settings or creates data structures on the target computer. The majority of the system settings or created data is not machine-specific. For example, registering example.dll sets three registry keys HKLM\SW\US\MyApp::info1=MyAppName, etc.) regardless of what system (e.g., the target computer) it is installed on or the configuration of that system. The action of creating the registry keys wastes time since it takes time to perform the action for each file. In the present invention, the system settings or other data structures are created before installation time (e.g., during the building and compiling of the application). The created data structures are merged into the target computer's existing data structure. Similarly, the copying of files for an operating system or an application program to the target computer individually is slower than copying a single image to a local CRM during installation and then moving the files individually from the image to their appropriate location in the file system. Further, data that is machine specific (e.g. registry key KeyFoo=machine_specific_security_ID+"applicationname") is recreated after the imaging process.

Machine-specific installation tasks have been separated from common installation tasks by pre-processing the software product. For example, common tasks include, but are not limited to, configuring system settings (e.g., registry keys) and registering software objects (e.g., registering a dynamic link library). The common tasks are performed prior to imaging or otherwise applying the software product. Machine-specific tasks include, but are not limited to, generating security information for the target computer, generating machine-specific settings based on the security information of the target computer (e.g., encrypting keys), and detecting hardware. The small set of machine-specific tasks are performed on the target computer after applying the image. In general, the software imaging process of the invention results in a lower failure rate than the traditional install process of copying files, creating the registry entries and keys, and registering software objects all on the target computer.

Referring first to FIG. 1, an exemplary block diagram illustrates the transfer of a run-time image 1 from a source CRM 5 to at least one target CRM 40 of a target computer 35. For example, the source CRM 5 and the target CRM 40 are mass storage devices. In one embodiment, the transfer occurs via at least one transfer CRM 20. The source CRM 5 includes the run-time image 1, as described herein, of an operating system or an application program or both. In one embodiment, the transfer includes copying or otherwise transferring at 7 the run-time image 1 and copying or otherwise transferring at 9 an executable install routine 10 to the transfer CRM 20. It will be appreciated by those skilled in the art that the copying at 7 and at 9 may be implemented by installing, imaging, or transferring data associated with the run-time image 1 and the executable install routine 10. The copying 7, 9 creates a copy of the run-time image 1 (e.g., image.img) and the executable install routine 10 on the transfer CRM 20 (as indicated by run-time image 25 and executable install routine 30). The transfer CRM 20 includes, but is not limited to, any removable or non-removable CRM such as a CD-ROM or a DVD-ROM. The executable install routine 10, 30 has functionality including, but not limited to, access to a CRM (file input/output), hardware detection (e.g., to load a HAL), a minimal user interface, and software routines to boot from and execute the installer program. Those skilled in the art will note that the executable install routine 10, 30 may have more or less functionality than described herein and still be within the scope of the invention as contemplated by the inventors.

In an embodiment in which the transfer CRM 20 is a removable CRM, a user inserts the transfer CRM 20 with the run-time image 25 and the executable install routine 30 into the target computer 35. The target computer 35 has access to the target CRM 40. The target computer 35 executes the executable install routine 30 to configure the target CRM 40 (e.g., a mass storage device). Such configuring of the target CRM 40 by the executable install routine 10, 30, 27 provides for disk geometry independence. That is, configuring the target CRM 40 allows the run-time image 1, 25, 26 to be applied to any target CRM 40 format, partitioning, or other geometry. The imaging process is not limited to the format or geometry of the run-time image 1, 25, 26. As such, it is contemplated by the inventors that configuring the target CRM 40 allows the imaging process of the invention to apply the run-time image 1, 25, 26 to any present or future CRM formats or file system formats.

In addition, the executable install routine 30, when executed, applies the run-time image 25 to the target CRM 40 to create run-time image 26 (e.g., in response to input from a user or via a script). In one embodiment, applying the run-time image 25 includes packaging the run-time image 25, transferring or copying the run-time image 25 to the target CRM 40, and/or validating the transferred or copied run-time image 26 stored on the target CRM 40 (e.g., via a cyclic redundancy check). Those skilled in the art will note that the run-time image 25 may be applied to the target CRM 40 and validated by various means known in the art and contemplated by the inventors to be within the scope of the invention. Further, applying the run-time image 25 may include simply copying the run-time image 25 to the target CRM 40 (e.g., on a file-by-file or a bit-by-bit basis).

The target computer 35 further executes the executable install routine 30 to integrate the run-time image 26 on the target CRM 40 with the target computer 35 by performing at least one integration task or otherwise manipulating data on the target CRM 40. Performing the integration tasks link or otherwise integrate the run-time image 26 with the target computer 35. Integration includes, but is not limited to, hardware detection and driver installation, software registration, and security identifier determination and encryption. In addition, the integration may include one or more reboots into the applied image. Other integration tasks may include branding (e.g., adding a splash screen on bootup) and pre-installing various application programs. The full installation of the pre-installed application programs then occurs after the reboot into the applied run-time image 26. The executable install routine 30 may be provided on the transfer CRM 20, provided on another CRM, or be otherwise accessible by the target computer 35. In addition, the executable install routine 30 may execute to copy some or all of its functionality to the target CRM 40 as executable install routine 27 for future execution (e.g., to perform integration tasks after a reboot into the run-time image 26).

The software routines of the invention may be employed to install any data including, but not limited to, an application program and an operating system. If the run-time image 26 is an application program, the executable install routine 30 may perform fewer integration tasks. For example, hardware detection, driver installation, and software registration may not occur during the transfer and integration of an application program. Abstracting the common installation tasks from the machine-specific tasks provides an image that has broader functionality.

In another example, the capabilities of different motherboards require support from different hardware abstraction layers (HALs) provided by an operating system. With the invention, a single operating system run-time image (such as run-time image 1) includes multiple HALs and hence will work with multiple different motherboards with differing power management needs and differing numbers of processors. The integration tasks include configuring the HAL and identifying any mass storage device controllers on the target computer 35.

Several alternative embodiments of the invention contemplated by the inventors to be within the scope of the invention are next described. In one such alternative embodiment, the executable install routine 30 copies only some of the functionality of the executable install routine 30 to the target CRM 40. Execution of the executable install routine 27 may occur after a reboot of the target computer 35 into the applied run-time image 26. In another embodiment, none of the functionality of the executable install routine 10 is copied to the transfer CRM 20 or to the target CRM 40. Instead, the executable install routine 10 is accessible by the target computer 35 for execution. In an embodiment lacking the transfer CRM 20, the target computer 35 accesses the run-time image 1 at 3 and the executable install routine 10 at 4 on the source CRM 5 via a direct connection or a network such as described with reference to FIG. 5.

If the run-time image 1 (or the run-time image 25) is an operating system, the target computer 35 boots from a minimal operating system stored on the source CRM 5 (or the transfer CRM 20), configures the target CRM 40, and applies the run-time image 1 (or the run-time image 25). In this manner, the software of the invention provides for applying the run-time image to a target computer such as target computer 35 that lacks an operating system installed on the target CRM 40. That is, the process includes applying the run-time image to the local mass storage device and configuring hardware and software settings of the applied image while still in the minimal operating system environment. The process then boots into the configured, applied image to perform any integration tasks.

If the run-time image 1 (or the run-time image 25) is an application program, the target computer 35 executes the executable install routine 10 (or the executable install routine 30 or the executable install routine 27) from an operating system of the target computer 35 to apply the run-time image 1 (or the run-time image 25) and/or integrate the applied run-time image 26 with the operating system of the target computer 35 (e.g., perform machine-specific tasks). The operating system of the target computer 35 may be a full operating system or a minimal operating system.

Those skilled in the art will note that the various CRM of the invention may be physically located in or accessible to one or more computers. Such variations in the physical location and connections among the CRM and the computers are well-known in the art and contemplated by the inventors to be within the scope of the invention. In addition, the elements illustrated in FIGS. 1–4 may be stored on a single CRM or a combination of a plurality of CRM. Further, the executable install routine 10 may be stored on the source CRM 5 or any other CRM prior accessible to a computer for applying and/or integrating the run-time image 26 with the target computer 35.

Figure 2:
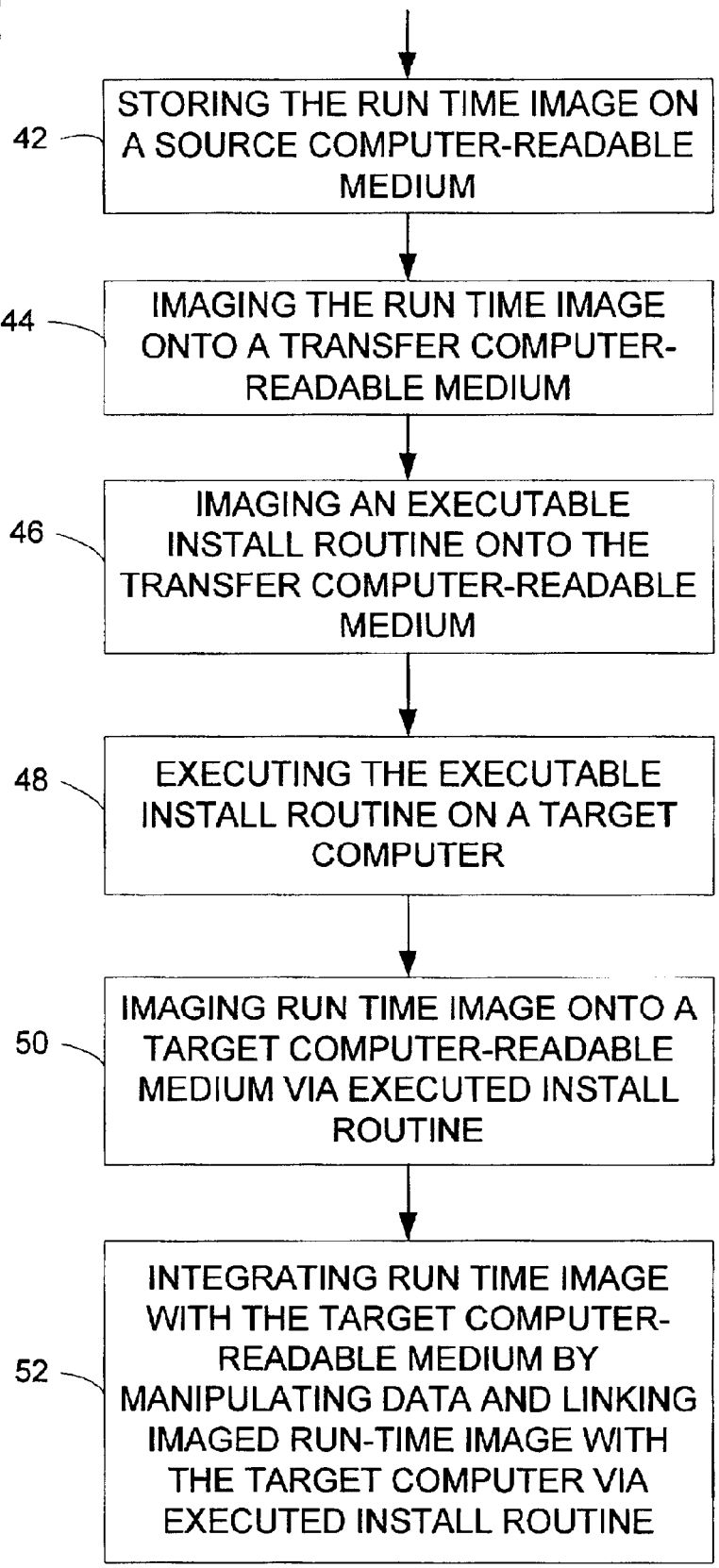
FIG. 2 is an exemplary flow chart illustrating the transfer of a run-time image from a source computer-readable medium to a target computer-readable medium.

Referring next to FIG. 2, an exemplary flow chart illustrates the transfer of the run-time image 1 from the source CRM 5 to a target CRM 40 via a transfer CRM 20. A system administrator or other user stores at 42 the run-time image 1 on the source CRM 5. The system administrator copies or transfers the run-time image 1 and the executable install routine 10 to the transfer CRM 20 at 44 and at 46, respectively. The target computer 35 executes at 48 the executable install routine 30 on the target computer 35 to apply at 50 the run-time image 25 stored on the transfer CRM 20 to the target CRM 40. Further, execution of the executable install routine (either executable install routine 30 or executable install routine 27 or both) on the target computer 35 at 48 integrates the run-time image 26 on the target CRM 40 with the target computer 35 at 52. The integration manipulates data stored on the target computer 35 to link the run-time image 26 on the target CRM 40 with the target computer 35.

Figure 3:
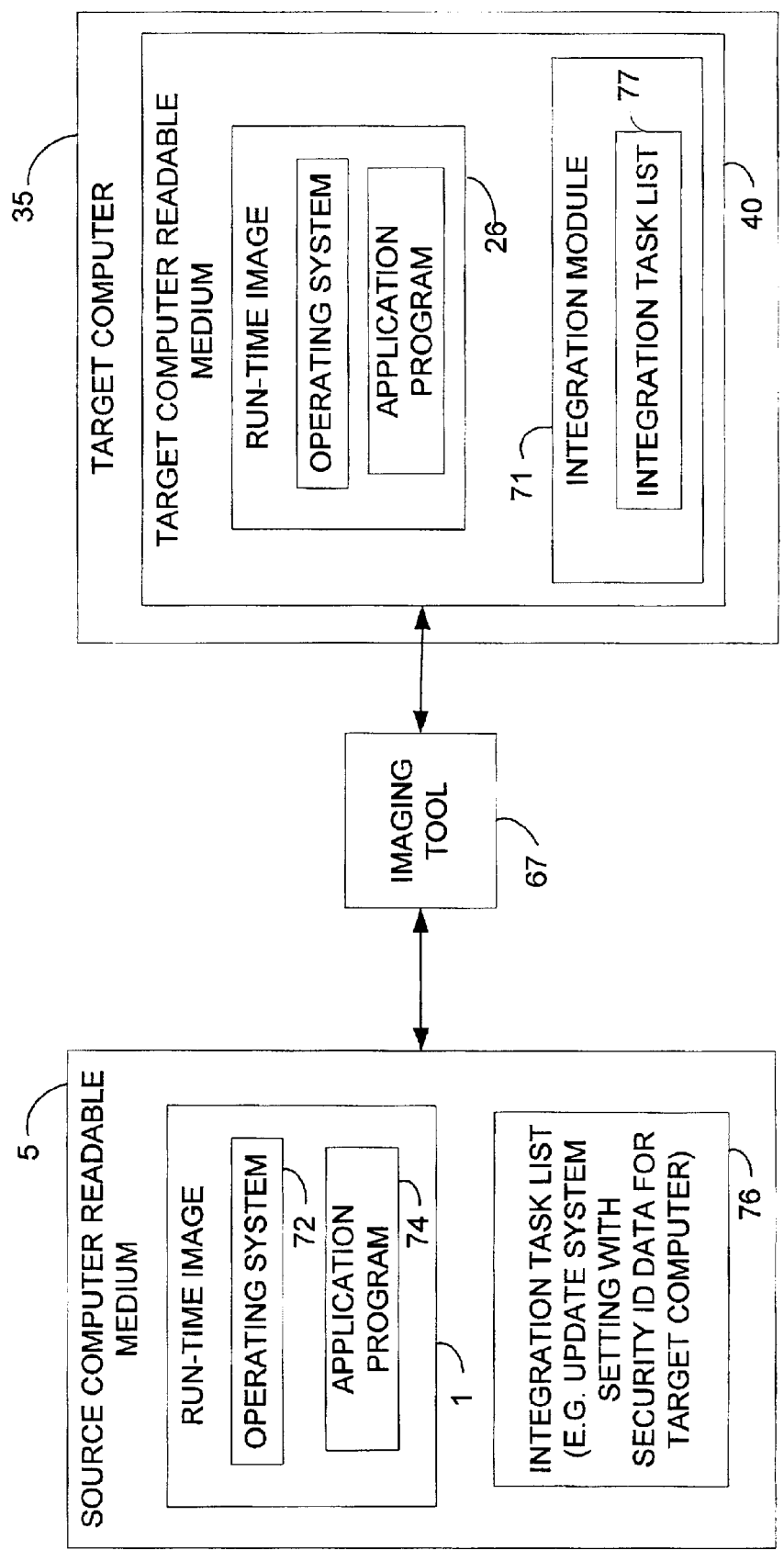
FIG. 3 is an exemplary block diagram illustrating the interaction of an imaging tool and an integration module with the source computer-readable medium and the target computer-readable medium.

Referring next to FIG. 3, an exemplary block diagram illustrates the interaction of an imaging tool 67 and an integration module 71 with the source CRM 5 and the target CRM 40. In the embodiment of FIG. 3, the functionality of the executable install routine 10 is separated into two components, applying and integrating, performed by the imaging tool 67 and the integration module 71, respectively. In such an embodiment, the imaging tool 67 may be a third-party, commercial-off-the-shelf, imaging product executed by the target computer 35 or another computer not associated with the target computer 35.

The source CRM 5 stores the run-time image 1 and an integration task list 76. As described herein, the run-time image 1 may include an operating system 72 and/or at least one application program 74. For example, the run-time image 1 may include any commercially available operating system or application program such as a word processor or a spreadsheet. The imaging tool 67 includes software functionality to apply the run-time image 1 and the integration task list 76 to the target CRM 40 as run-time image 26 and integration task list 77, respectively. The target CRM 40 is associated with the target computer 35 that is configured to execute the imaging tool 67 and the integration module 71 stored on the target CRM 40.

In one embodiment, the target computer 35 executes the imaging tool 67 to apply the run-time image 1 and the integration task list 76 to the target CRM 40 or any other CRM accessible by the target computer 35. The target computer 35 executes the integration module 71 to integrate the run-time image 26 with the target computer 35 by performing tasks listed in the integration task list 77. In addition to the integration tasks described elsewhere herein, the integration task list 76, 77 includes, but is not limited to, computer-executable instructions to update one or more system settings with security identification data to identify the target computer 35. Upon execution of the integration module 71, the target computer 35 performs each of the integration tasks to achieve integration between the run-time image 26 and the target computer 35.

In an alternative embodiment, a computer other than the target computer 35 executes the imaging tool 67 to apply the run-time image 1 and copy the integration task list 76 to the target CRM 40. In another embodiment, the imaging tool 67 includes or executes from a minimal operating system from which the target computer 35 boots. In a further embodiment, the imaging tool 67 applies the run-time image 1 to the target CRM 40, and the integration module 71 executes from the minimal operating system to integrate the run-time image 26 on the target CRM 40 with the target computer 35. The integration module 71 can be stored on a CRM other than the target CRM 40.

Figure 4:
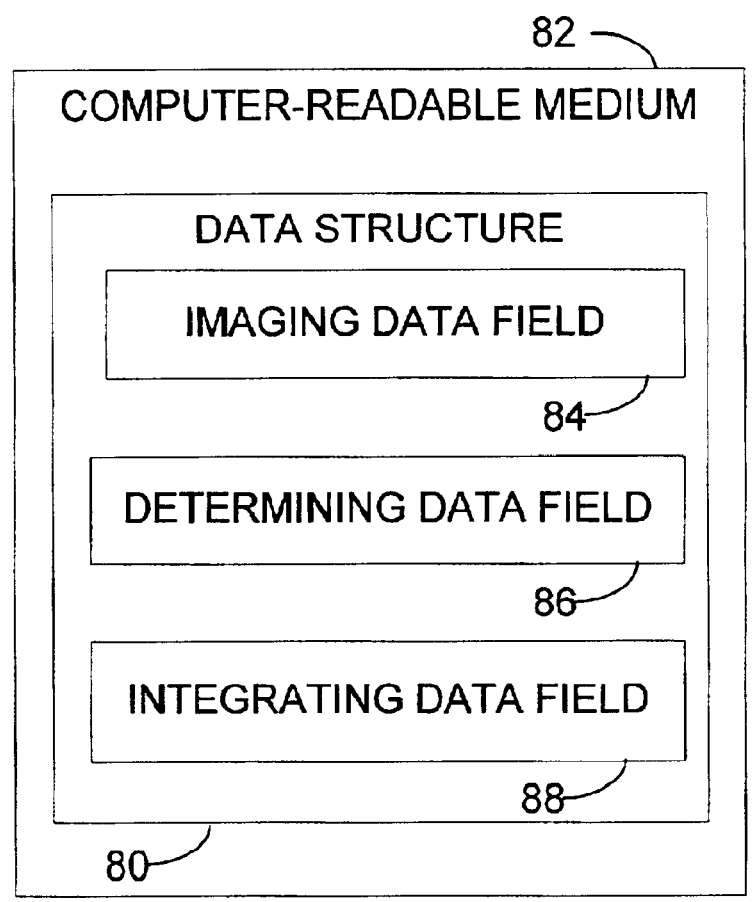
FIG. 4 is an exemplary block diagram illustrating the contents of a data structure stored on a computer-readable medium.

Referring next to FIG. 4, an exemplary block diagram illustrates the contents of a data structure 80 stored on a CRM 82 such as transfer CRM 20. The data structure 80 represents a list of one or more integration tasks that are executed by the target computer 35 to achieve integration between a run-time image 26 on the target CRM 40 and the target computer 35. In the exemplary embodiment of FIG. 4, the data structure 80 includes an imaging data field 84, a determining data field 86, and an integrating data field 88. The imaging data field 84 stores computer-executable instructions for applying the run-time image 1 to the target CRM 40. As described herein, the computer-executable instructions associated with the imaging data field 84 may be part of a third-party, commercial-off-the-shelf, imaging product executed by the target computer 35 or another computer not associated with the target computer 35. The determining data field 86 stores computer-executable instructions for determining one or more parameters specific to the target computer 35. For example, the computer-executable instructions may obtain security identification data specific to the target computer 35. The integrating data field 88 stores computer-executable instructions for integrating the determined parameters and the run-time image 26. For example, the computer-executable instructions may encrypt one or more keys with the security identification data obtained via the determining data field 86.

Figure 5:
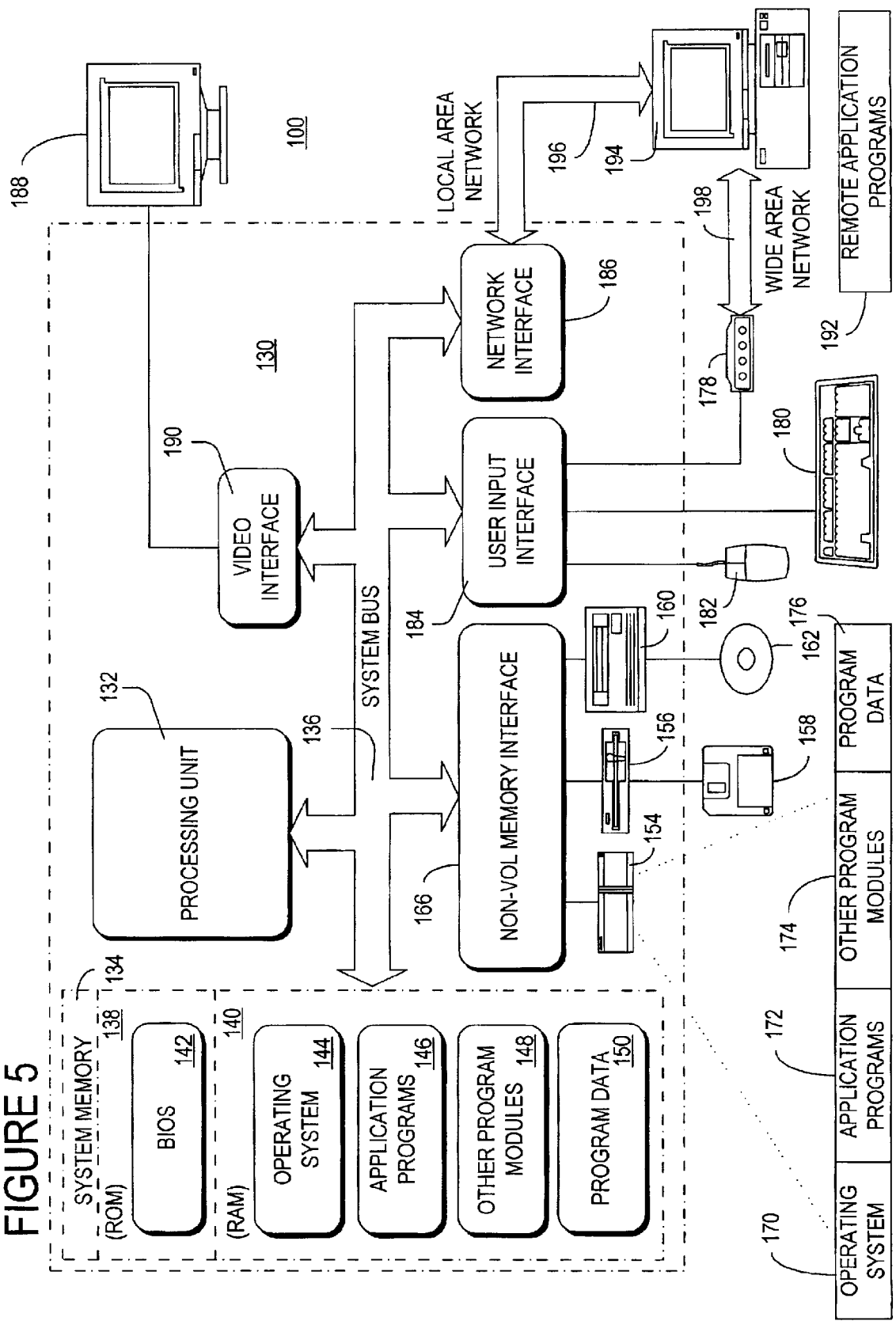
FIG. 5 is a block diagram illustrating one example of a suitable computing system environment on which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/ output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer-readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, the target computer 35 (such as computer 130) executes computer-executable instructions such as those illustrated in FIG. 2 to transfer the run-time image 1 independent of computer context from the source CRM 5 to the target CRM 40 of the target computer 35.

An example of a method for pre-processing a software product (e.g., an operating system or an application program) to create a run-time image such as run-time image 1 in FIG. 1 follows.

The source code for a software program is compiled by software developers to produce executable files and other files. The files are grouped into components which are then assembled into the software product to create an image. The image of the software product is then applied to a computer. The process for applying the image of the software product to a computer may include booting into a minimal operating system (e.g., via a CD, DVD, or a network boot) and locating the image. The image may be stored on a local CD, DVD, a mass storage device, or other CRM. Alternatively, the image may be stored on a CRM accessible via a network. Configuration options input by a software developer via a user interface are stored in a file accessible by the computer to receive the image of the software product. For example, the configuration options may include an unattended install option, a clean install option, and advanced installation options. The computer prepares a local CRM based on the configuration options. The software product is then installed to the local CRM of the computer according to the configuration options. At the conclusion of pre-processing, the image of the software product is a run-time image such as run-time image 1 in FIG. 1 that is ready to be applied to the target computer 35 according to the invention.

Once the run-time image 1 has been applied to the target computer 35, any machine-specific configuration not performed during pre-processing then occurs during integration. In one embodiment, image configuration occurs while the target computer 35 is still in a minimal operating system environment. As described herein, such configuration or integration may include, but is not limited to, configuring/registering software objects in the image, adding or removing components, configuring system settings (e.g., registry settings), moving and decompressing files, and selecting an appropriate language for the locale of the computer. The applied image is then booted and additional configuration items may be processed. Configuration items that may be performed before or after booting include, but are not limited to, resetting user settings and adding device drivers to prepare the image to boot on any hardware, generating security data specific to the target computer 35, and generating any keys required by the applied software program that are based on the generated security data.

Those skilled in the art will note that variations in the description of the invention herein and the examples described herein is permitted within the scope of the invention. For example, variations on the above examples includes a setup flow for a clean install for retailers. Further, other variations include a setup flow for an upgrade installation for retailers. Such variations are contemplated by the inventors to be within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of transferring a run-time image independent of computer context from a source computer-readable medium to one or more target computer-readable media of a target computer via one or more transfer computer-readable media, said method comprising:

storing a plurality of hardware abstraction layer drivers in the run-time image;

copying the run-time image onto the transfer media; and copying an executable install routine onto the transfer media, wherein said executable install routine, when executed by the target computer, applies the run-time image to the target media and integrates the applied run-time image with the target computer, wherein integrating the applied run-time image with the target computer includes configuring one of the stored plurality of hardware abstraction layer drivers for the target computer.

2. The method of claim 1, wherein the run-time image comprises an operating system or an application program or both.

3. The method of claim 1, wherein said executable install routine, when executed by the target computer, performs one or more data manipulation operations on the target media to link the applied run-time image with the target computer.

4. The method of claim 3, wherein said data manipulation operations comprise updating system settings for the target computer.

5. The method of claim 1, wherein said executable install routine comprises a minimal operating system from which the target computer boots.

6. The method of claim 1, wherein one or more computer-readable media have computer-executable instructions for performing the method of claim 1.

7. A method of transferring a run-time image independent of computer context from a source computer-readable medium to one or more target computer-readable media of a target computer, said method comprising:

applying the run-time image to the target media, said run-time image including a plurality of hardware abstraction layer drivers; and copying an executable install routine to the target media, wherein said executable install routine, when executed by the target computer, integrates the applied run-time image with the target computer, selects one of the plurality of hardware abstraction layer drivers from the run-time image, and configures the selected hardware abstraction layer driver for the target computer.

8. The method of claim 7, wherein the run-time image comprises an operating system or an application program or both.

9. The method of claim 7, wherein said executable install routine, when executed by the target computer, integrates the run-time image with the target computer by performing one or more data manipulation operations on the target media to link the applied run-time image with the target computer.

10. The method of claim 9, wherein said data manipulation operations comprise updating at least one system setting.

11. The method of claim 7, wherein one or more computer-readable media have computer-executable instructions for performing the method of claim 7.

12. One or more computer-readable media having computer-executable components for applying a run-time image independent of computer context to one or more target computer-readable media of a target computer, said components comprising:

a run-time image for use by the target computer, said run-time image including a plurality of hardware abstraction layer drivers; and an executable install routine which, when executed by the target computer, applies the run-time image onto the target media and integrates the applied run-time image with the target computer, wherein integrating the applied run-time image with the target computer includes configuring one of the plurality of hardware abstraction layer drivers from the run-time image for the target computer.

13. The computer-readable media of claim 12, wherein the run-time image comprises an operating system or an application program or both.

14. The computer-readable media of claim 12, wherein the executable install routine comprises a list of one or more integration tasks, and wherein the executable install routine, when executed by the target computer, performs each of the integration tasks in the list to integrate the applied run-time image with the target computer.

15. The computer-readable media of claim 14, wherein the integration tasks comprise updating one or more settings for the target computer with security identification data identifying the target computer.

16. The computer-readable media of claim 12, wherein the components further comprise a minimal operating system from which the target computer boots.

17. A computer-readable medium having stored thereon a data structure representing a list of one or more integration tasks to be executed to integrate a run-time image independent of computer context with a target computer having one or more target computer-readable media, said data structure comprising one or more data fields storing computer-executable instructions for:

applying the run-time image to the target media;

determining one or more parameters specific to the target computer, said determining including selecting a hardware abstraction layer driver for the target computer from a plurality of hardware abstraction layer drivers in the run-time image; and integrating the determined parameters and the applied run-time image, wherein integrating the determined parameters and the applied run-time image includes configuring the selected hardware abstraction layer driver for the target computer.

18. The computer-readable medium of claim 17, wherein the parameters comprise security identification data or a hardware abstraction layer or both.

19. The computer-readable medium of claim 17, wherein the data field further stores computer-executable instructions for booting the target computer.

20. One or more computer-readable media having computer-executable components for applying a run-time image independent of computer context to one or more target computer-readable media of a target computer, said components comprising:

an imaging tool for applying the run-time image to the target media, wherein the run-time image includes a plurality of hardware abstraction layer drivers; and an integration module for configuring one of the plurality of hardware abstraction layer drivers for the target computer and integrating the applied run-time image with the target computer.

21. The computer-readable media of claim 20, wherein the imaging tool, when executed, copies at least one file to the target media.

22. The computer-readable media of claim 21, wherein the imaging tool, when executed, validates the copied file on the target media.

23. The computer-readable media of claim 20, wherein the target computer executes the imaging tool.

24. The computer-readable media of claim 20, wherein the target computer comprises an operating system, wherein the run-time image comprises an application program, and wherein the target computer executes the integration module from the operating system to integrate the applied run-time image with the target computer.

25. The computer-readable media of claim 20, wherein the integration module, when executed by the target computer, determines one or more parameters specific to the target computer and integrates the determined parameters and the run-time image.

* * * * *